United States Patent
Wei

(10) Patent No.: US 12,497,200 B2
(45) Date of Patent: Dec. 16, 2025

(54) UNMANNED AERIAL VEHICLE

(71) Applicant: AUTEL ROBOTICS CO., LTD., Shenzhen (CN)

(72) Inventor: Xinfu Wei, Guangdong (CN)

(73) Assignee: AUTEL ROBOTICS CO., LTD., Guangdong (CN)

(*) Notice: Subject to any disclaimer, the term of this patent is extended or adjusted under 35 U.S.C. 154(b) by 0 days.

(21) Appl. No.: 18/425,140

(22) Filed: Jan. 29, 2024

(65) Prior Publication Data

US 2024/0351714 A1 Oct. 24, 2024

Related U.S. Application Data

(63) Continuation of application No. PCT/CN2022/105440, filed on Jul. 13, 2022.

(30) Foreign Application Priority Data

Jul. 30, 2021 (CN) .......................... 202110871427.9

(51) Int. Cl.
*B64U 60/50* (2023.01)
*B64U 60/40* (2023.01)

(52) U.S. Cl.
CPC ............. *B64U 60/50* (2023.01); *B64U 60/40* (2023.01)

(58) Field of Classification Search
CPC ........ B64U 20/80; B64U 10/14; B64U 50/30; B64U 50/19; B64C 17/02
See application file for complete search history.

(56) References Cited

U.S. PATENT DOCUMENTS

| | | | |
|---|---|---|---|
| 9,102,402 B2* | 8/2015 | Dubois | B64C 25/28 |
| 10,065,726 B1* | 9/2018 | Phan | B64D 17/80 |
| 11,396,934 B2* | 7/2022 | Quenerch'Du | E05B 47/0001 |
| 11,634,230 B2* | 4/2023 | Kawai | B64D 27/24 |
| | | | 244/17.11 |

(Continued)

FOREIGN PATENT DOCUMENTS

| CN | 102431644 A | 5/2012 |
|---|---|---|
| CN | 102602529 A | 7/2012 |

(Continued)

OTHER PUBLICATIONS

International Search Report mailed Sep. 28, 2022; PCT/CN2022/105440.

(Continued)

*Primary Examiner* — Medhat Badawi

(57) ABSTRACT

An embodiment of this disclosure relates to an unmanned aerial vehicle, including a fuselage and a landing gear. The landing gear includes a driving device, a first transmission shaft, and a first supporting leg. The driving device is disposed on the fuselage. One end of the first transmission shaft is connected to the driving device, the other end of the first transmission shaft is connected to the first supporting leg. The driving device is configured to drive the first transmission shaft. The first transmission shaft drives the first supporting leg to rotate. An included angle between a connection line from one end to the other end of the first supporting leg and a first rotation axis of the first supporting leg is greater than zero, and an included angle between the first rotation axis and an axial section of the fuselage is an acute angle.

15 Claims, 5 Drawing Sheets

(56) References Cited

U.S. PATENT DOCUMENTS

| | | | | |
|---|---|---|---|---|
| 11,772,794 B2* | 10/2023 | Hanna | ................... | B64C 39/024 |
| | | | | 244/17.13 |
| 12,227,306 B2* | 2/2025 | Ratajczak | ................ | B64D 1/10 |
| 2006/0163426 A1* | 7/2006 | Smith, III | ............... | B64C 25/26 |
| | | | | 244/102 R |
| 2010/0332095 A1* | 12/2010 | Colin | ................... | B60T 13/741 |
| | | | | 701/70 |
| 2012/0168561 A1* | 7/2012 | Salmon | .................. | B64C 25/26 |
| | | | | 244/102 A |
| 2013/0105624 A1* | 5/2013 | Dubois | .................. | B64C 25/28 |
| | | | | 244/102 R |
| 2013/0175390 A1* | 7/2013 | Woodworth | ........... | B64U 50/13 |
| | | | | 244/54 |
| 2013/0313360 A1* | 11/2013 | Chow | .................... | B64C 25/26 |
| | | | | 244/102 A |
| 2016/0159468 A1* | 6/2016 | Harris, III | ............... | B64C 25/36 |
| | | | | 244/102 R |
| 2018/0327092 A1* | 11/2018 | Deng | ................... | B64C 39/024 |
| 2019/0193844 A1* | 6/2019 | Zheng | ................... | B64U 60/40 |
| 2020/0377212 A1* | 12/2020 | Deng | ................... | B64C 39/024 |
| 2021/0261253 A1* | 8/2021 | Hanna | .................... | B64D 27/24 |
| 2022/0402607 A1* | 12/2022 | Deng | ................... | B64U 10/14 |
| 2024/0166341 A1* | 5/2024 | Wei | ........................ | B64U 60/50 |
| 2024/0294253 A1* | 9/2024 | Hanna | .................... | B64U 10/13 |
| 2024/0351714 A1* | 10/2024 | Wei | ........................ | B64U 60/40 |
| 2024/0417113 A1* | 12/2024 | Loh | ........................ | B64U 40/10 |
| 2025/0002140 A1* | 1/2025 | Nguyen | .................... | F16D 1/10 |
| 2025/0026006 A1* | 1/2025 | Deemyad | ............... | B64U 70/30 |

FOREIGN PATENT DOCUMENTS

| | | |
|---|---|---|
| CN | 103523209 A | 1/2014 |
| CN | 205345112 U | 6/2016 |
| CN | 107454882 A | 12/2017 |
| CN | 206704520 U | 12/2017 |
| CN | 108146618 A | 6/2018 |
| CN | 207758999 U | 8/2018 |
| CN | 108698685 A | 10/2018 |
| CN | 211076320 U | 7/2020 |
| CN | 113525671 A | 10/2021 |
| CN | 113602483 A | 11/2021 |
| CN | 215944872 U | 3/2022 |
| JP | 2001347997 A | 12/2001 |

OTHER PUBLICATIONS

The first office action of the CN priority application, Appln. No. 202110871427.9, issued Dec. 24, 2024, and English machine translation.

* cited by examiner

UNMANNED AERIAL VEHICLE

CROSS-REFERENCE TO RELATED APPLICATIONS

This application is a continuation of International Patent Application No. PCT/CN2022/105440, filed Jul. 13, 2022, which claims priority to and the benefit of Chinese Patent Application No. 2021108714279, filed Jul. 30, 2021, the entireties of which are hereby incorporated herein by reference.

TECHNICAL FIELD

Embodiments of this disclosure relate to the field of unmanned aerial vehicle technologies.

BACKGROUND

An unmanned aerial vehicle is referred to as a UAV for short. The unmanned aerial vehicle is a non-manned aircraft operated by a radio remote control device and a self-contained program control apparatus, or a non-manned aircraft completely or intermittently autonomously operated by an on-board computer. Currently, the unmanned aerial vehicle is widely used in fields such as aerial photography, agriculture, plant protection, micro self-portrait photography, express delivery transportation, disaster relief, wild animal observation, infectious disease surveillance, surveying and mapping, news reporting, power inspection, disaster rescue, and film and television photography. The unmanned aerial vehicle includes a fuselage and a landing gear. When the unmanned aerial vehicle lands on the ground or other objects, the landing gear supports the fuselage of the unmanned aerial vehicle. The landing gear includes a first supporting leg.

During implementing this disclosure, the applicant in this disclosure has found that: Currently, a first rotation axis of the first supporting leg is perpendicular to an axial section of the fuselage. When the first supporting leg is retracted or extended, it is not applicable in some occasions in which a distance between one end of the first supporting leg away from the fuselage and the axial section of the fuselage is fixed. For example, it is not applicable when the first supporting leg is expected to be close to the fuselage when retracted, but away from the fuselage when extended, or it is not applicable when the first supporting leg is expected to be away from the fuselage when retracted, but close to the fuselage when extended.

SUMMARY

For the foregoing problem, an embodiment of this disclosure provides an unmanned aerial vehicle that overcomes, or at least partially resolves, a problem that a distance between one end of the first supporting leg away from a fuselage and an axial section of the fuselage is fixed and not applicable in some occasions.

According to an aspect of this disclosure, an unmanned aerial vehicle is provided, including a fuselage and a landing gear. The landing gear includes a driving device, a first transmission shaft, and a first supporting leg. The driving device is disposed on the fuselage. One end of the first transmission shaft is connected to the driving device, the other end of the first transmission shaft is connected to the first supporting leg. The driving device is configured to drive the first transmission shaft. The first transmission shaft drives the first supporting leg to rotate. An included angle between a connection line from one end to the other end of the first supporting leg and a first rotation axis of the first supporting leg is greater than zero, and an included angle between the first rotation axis and an axial section of the fuselage is an acute angle.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding this disclosure, this disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside", and similar expressions used in this specification are merely used for an illustrative purpose.

Unless otherwise defined, all descriptions of technical and scientific terms used herein have the same meaning as commonly understood by a person skilled in the art to which this disclosure belongs. Terms used in specification of this disclosure are merely intended to describe objectives of specific embodiments, but are not intended to limit this disclosure. A term "and/or" used in this specification includes any or all combinations of one or more related listed items.

Figure 1:
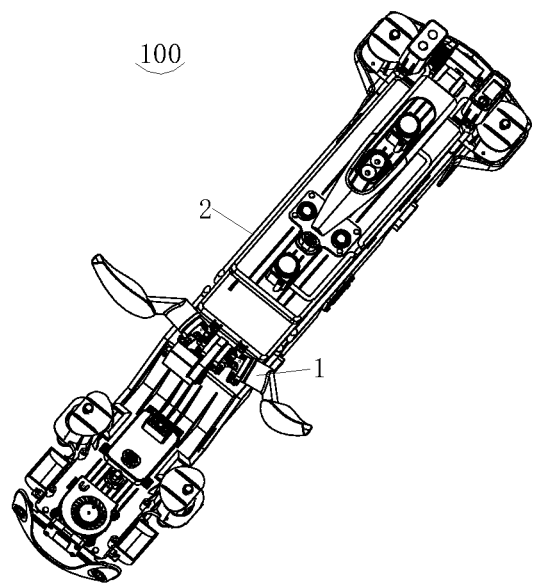
FIG. 1 is a schematic diagram of one direction of an unmanned aerial vehicle according to an embodiment of this disclosure.

Refer to FIG. 1. An unmanned aerial vehicle 100 comprises a landing gear 1 and a fuselage 2. The landing gear 1 is disposed on the fuselage 2. The landing gear 1 is configured to support the fuselage 2 when the unmanned aerial vehicle 100 lands on the ground.

Figure 2:
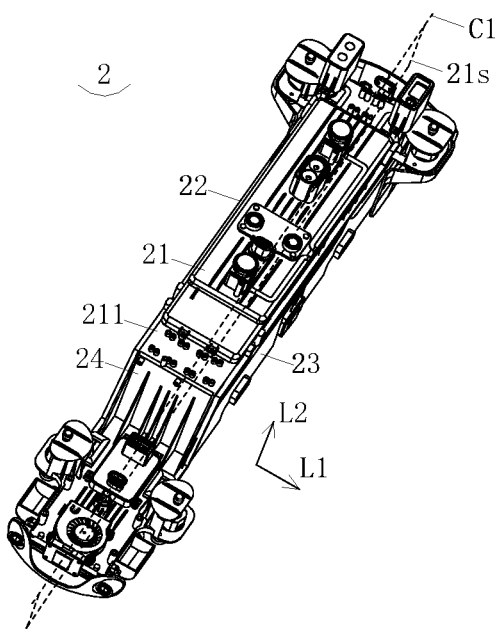
FIG. 2 is a schematic diagram of one direction of a fuselage according to an embodiment of this disclosure.
Figure 3:
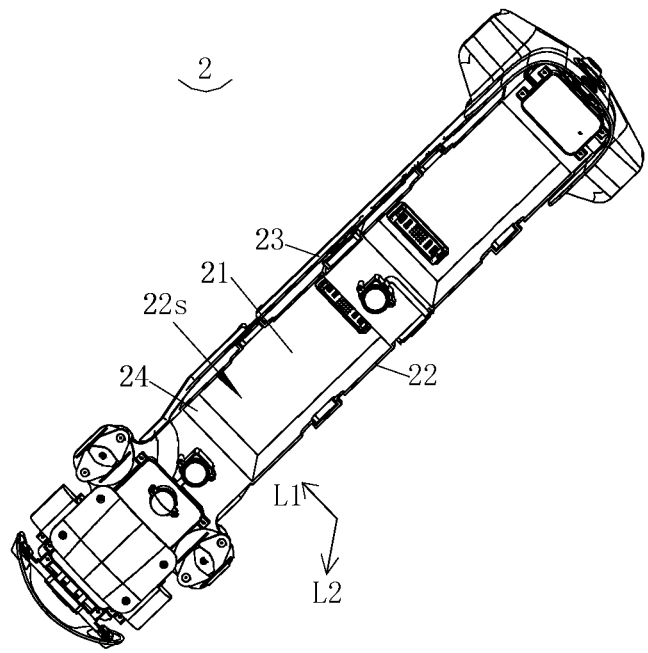
FIG. 3 is a schematic diagram of another direction of a fuselage according to an embodiment of this disclosure.

For the fuselage 2, refer to FIG. 2 and FIG. 3. In some embodiments, the fuselage 2 includes a first wall 21, a second wall 22, a third wall 23, and a fourth wall 24. The second wall 22 and the third wall 23 are connected to two ends of the first wall 21 along a width direction L1 of the fuselage 2. An axial section 21s of the fuselage 2 is perpendicular to the width direction L1 of the fuselage 2, a centerline C1 of the first wall 21 is perpendicular to the width direction L1 of the fuselage 2, and the axial section 21s of the fuselage 2 passes through the centerline C1 of the first wall 21. The fourth wall 24 is separately connected to the first wall 21, the second wall 22, and the third wall 23. The fourth wall 24, the first wall 21, the second wall 22, and the third wall 23 are enclosed to form an accommodating cavity 22s. The first wall 21 is concave towards the accommodating cavity 22s to form a concave part 211 that is configured to dispose the landing gear 1.

Figure 4:
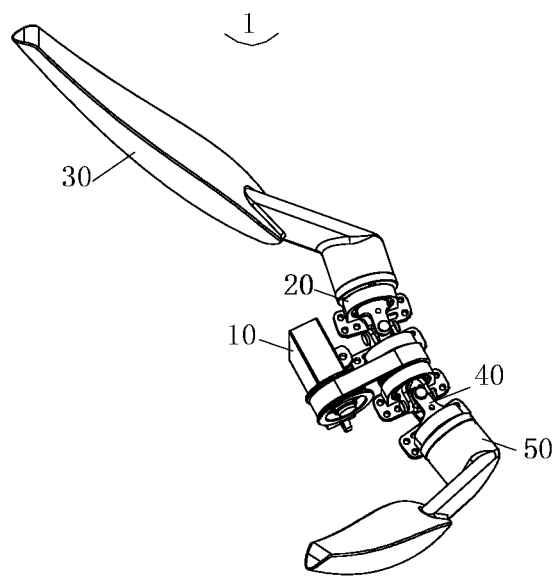
FIG. 4 is a schematic diagram of a landing gear according to an embodiment of this disclosure.

For the landing gear 1, refer to FIG. 4. The landing gear 1 includes a driving device 10, a first transmission shaft 20, a first supporting leg 30, a second transmission shaft 40, and a second supporting leg 50. The driving device 10 is connected to one end of the first transmission shaft 20. The first supporting leg 30 is connected to the other end of the first transmission shaft 20. The driving device 10 is configured to drive the first transmission shaft 20, and the first transmission shaft 20 drives the first supporting leg 30 to rotate. The driving device 10 is connected to one end of the second transmission shaft 40. The second supporting leg 50 is connected to the other end of the second transmission shaft 40. The driving device 10 is configured to drive the second transmission shaft 40, and the second transmission shaft 40 drives the second supporting leg 50 to rotate.

Figure 5:
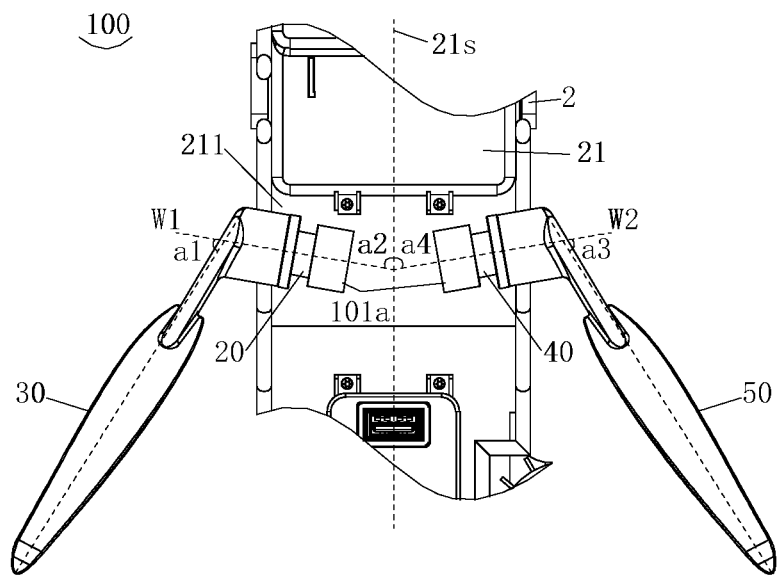
FIG. 5 is a schematic diagram of an implementation in which a driving device is disposed on a first wall according to an embodiment of this disclosure.
Figure 6:
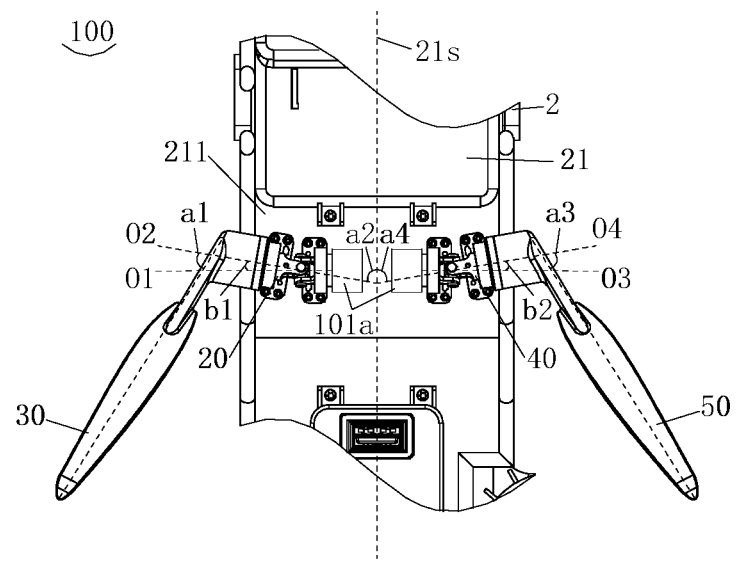
FIG. 6 is a schematic diagram of another implementation in which a driving device is disposed on a first wall according to an embodiment of this disclosure.

For the driving device 10, refer to FIG. 5 and FIG. 6. In some embodiments, the driving device 10 includes two driving cells 101a, the two driving cells 101a are disposed on the fuselage 2. One driving cell 101a is connected to one end of the first transmission shaft 20, and the other driving cell 101a is connected to one end of the second transmission shaft 40. One driving cell 101a is configured to drive the first transmission shaft 20, and the other driving cell 101a is configured to drive the second transmission shaft 40.

Figure 7:
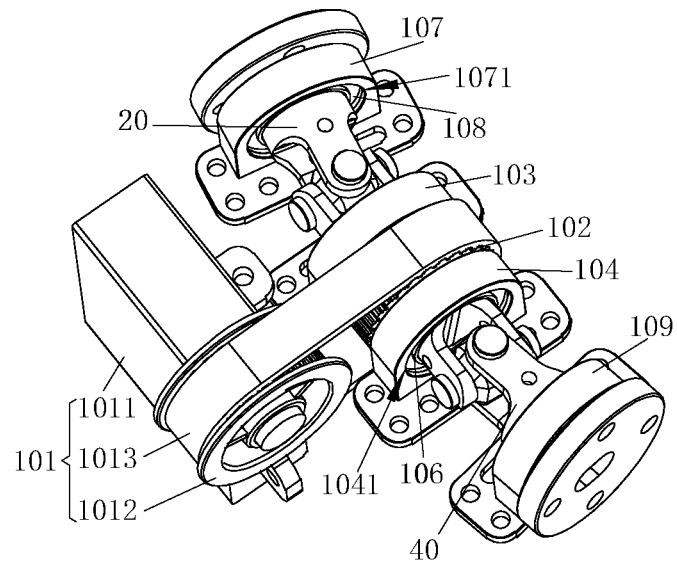
FIG. 7 is a schematic diagram of one direction of a driving device according to an embodiment of this disclosure.
Figure 8:
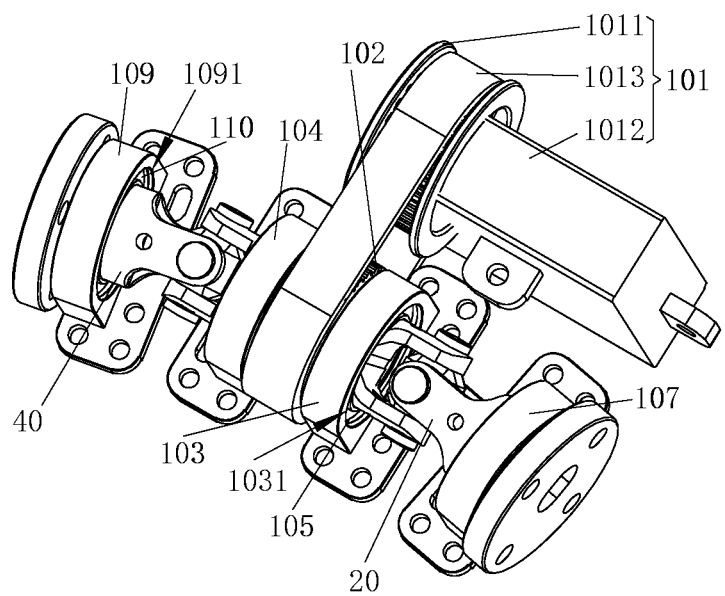
FIG. 8 is a schematic diagram of another direction of a driving device according to an embodiment of this disclosure.

For the driving device 10, refer to FIG. 7 and FIG. 8. In some embodiments, the driving device 10 includes a driving assembly 101 and a synchronous wheel 102. The driving assembly 101 is disposed on the fuselage 2, the driving assembly 101 is connected to the synchronous wheel 102, and the driving assembly 101 is configured to drive the synchronous wheel 102 to rotate. One end of the synchronous wheel 102 is connected to one end of the first transmission shaft 20, and when the driving assembly 101 drives the synchronous wheel 102 to rotate, the synchronous wheel 102 drives the first transmission shaft 20 to rotate. The other end of the synchronous wheel 102 is connected to one end of the second transmission shaft 40, and when the driving assembly 101 drives the synchronous wheel 102 to rotate, the synchronous wheel 102 drives the second transmission shaft 40 to rotate.

For the driving assembly 101, in some embodiments, the driving assembly 101 includes a driving unit 1011, a driving wheel 1012, and a synchronous belt 1013. The driving unit 1011 is disposed on the fuselage 2. The driving wheel 1012 is rotatably connected to the driving unit 1011, and the synchronous belt 1013 is looped around the driving wheel 1012 and the synchronous wheel 102. The driving unit 1011 is configured to drive the driving wheel 1012 to rotate, thereby driving the synchronous wheel 102 to rotate, and then driving the first transmission shaft 20 and the second transmission shaft 40 to rotate.

In some embodiments, the driving device 10 further includes a first bracket 103, a second bracket 104, a first bearing 105, a second bearing 106, a third bracket 107, a third bearing 108, a fourth bracket 109, and a fourth bearing 110. The first bracket 103, the second bracket 104, the third bracket 107, and the fourth bracket 109 are disposed on the fuselage 2. The first bracket 103 is provided with a first through hole 1031, and the first bearing 105 is mounted in the first through hole 1031. The second bracket 104 is provided with a second through hole 1041, and the second bearing 106 is mounted in the second through hole 1041. The first bearing 105 is configured to dispose one end of the first transmission shaft 20. The second bearing 106 is configured to dispose one end of the second transmission shaft 40. The third bracket 107 is provided with a third through hole 1071, the third bearing 108 is mounted in the third through hole 1071, and the third bearing 108 is configured to dispose the other end of the first transmission shaft 20. The fourth bracket 109 is provided with a fourth through hole 1091, the fourth bearing 110 is mounted in the fourth through hole 1091, and the fourth bearing 110 is configured to dispose the other end of the second transmission shaft 40.

It should be noted that a function of driving the first transmission shaft 20 and the second transmission shaft 40 by the driving device 10 can alternatively be achieved without disposing the first bracket 103, the second bracket 104, the first bearing 105, the second bearing 106, the third bracket 107, the third bearing 108, the fourth bracket 109, and the fourth bearing 110.

Figure 9:
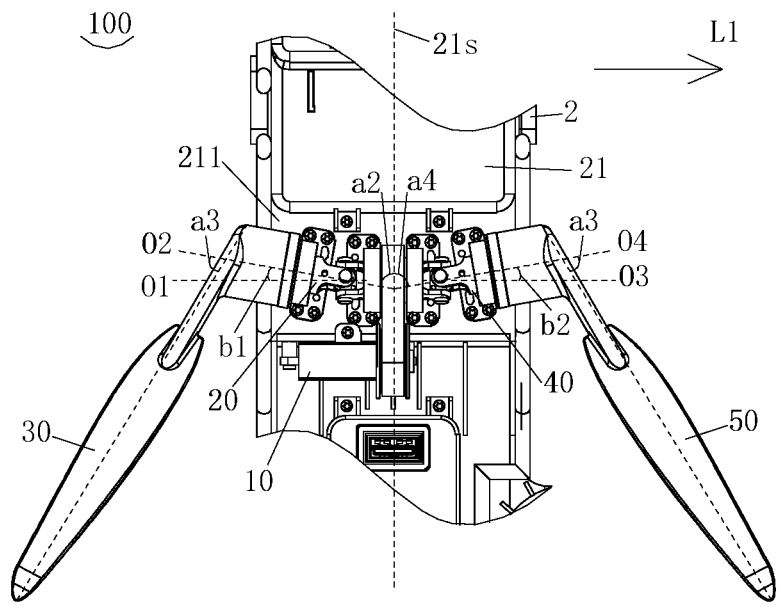
FIG. 9 is a schematic diagram of another direction of an unmanned aerial vehicle according to an embodiment of this disclosure.

For the first transmission shaft 20 and the first supporting leg 30, refer to FIG. 9. One end of the first transmission shaft 20 is connected to the driving device 10, and the other end of the first transmission shaft 20 is connected to the first supporting leg 30. The first transmission shaft 20 drives the first supporting leg 30 to rotate. An included angle a1 between a connection line from one end to the other end of the first supporting leg 30 and a first rotation axis W1 of the first supporting leg 30 is greater than zero, and the connection line from one end to the other end of the first supporting leg 30 does not coincide with the first rotation axis W1 of the first supporting leg 30. An included angle a2 between the first rotation axis W1 and an axial section 21s of the fuselage 2 is an acute angle. Because the included angle a2 between the first rotation axis W1 of the first supporting leg 30 and the axial section 21s of the fuselage 2 is an acute angle, and the included angle a1 between the connection line from one end to the other end of the first supporting leg 30 and the first rotation axis W1 of the first supporting leg 30 is greater than zero, when the first supporting leg 30 rotates, one end of the first supporting leg 30 away from the fuselage 2 can be close to and retracted to the fuselage 2 or away from the fuselage 2.

In some embodiments, an angle range of the acute angle is between 30 and 60 degrees.

Refer to FIG. 5. The first transmission shaft 20 may rotate along the first rotation axis W1. When the driving device 10 includes one driving cell 101a, the driving cell 101a drives the first transmission shaft 20 to rotate along the first rotation axis W1.

The first transmission shaft 20 may rotate along first rotation axis W1. When the driving device 10 includes the driving assembly 101 and the synchronous wheel 102, one end of the synchronous wheel 102 drives the first transmission shaft 20 to rotate along the first rotation axis W1.

Refer to FIG. 6. The first transmission shaft 20 can rotate about a first direction O1 and a second direction O2. An included angle b1 between the first direction O1 and the second direction O2 is an acute angle. The first direction O1 is perpendicular to the axial section 21s of the fuselage 2. The second direction O2 coincides with the first rotation axis W1. In other words, the included angle a2 between the second direction O2 and the axial section 21s of the fuselage 2 is an acute angle. When the driving device 10 includes one driving cell 101a, the driving cell 101a drives the first transmission shaft 20 to rotate about the first direction O1 and the second direction O2.

Refer to FIG. 8 and FIG. 9. The first transmission shaft 20 can rotate about a first direction O1 and a second direction O2. An included angle b1 between the first direction O1 and the second direction O2 is an acute angle. The first direction O1 is perpendicular to the axial section 21s of the fuselage 2. The second direction O2 coincides with the first rotation axis W1. In other words, the included angle a2 between the second direction O2 and the axial section 21s of the fuselage 2 is an acute angle. When the driving device 10 includes the driving assembly 101 and the synchronous wheel 102, one end of the synchronous wheel 102 drives the first transmission shaft 20 to rotate about the first direction O1 and the second direction O2.

It should be noted that in some embodiments, the first transmission shaft 20 is a cardan shaft.

When the first transmission shaft 20 rotates about the first direction O1 and the second direction O2, the driving device 10 drives the first transmission shaft 20 to rotate, and the first transmission shaft 20 drives the first supporting leg 30 to rotate about the second direction O2, that is, the first transmission shaft 20 drives the first supporting leg 30 to rotate about the first rotation axis W1, so that rotation flexibility of the first supporting leg 30 is good.

When the first supporting leg 30 in the landing gear 1 of the unmanned aerial vehicle 100 is retracted or lowered, the first transmission shaft 20 rotates about the first direction O1 and the second direction O2. This brings a user's different perception when the first transmission shaft 30 rotates about one direction.

Figure 10:
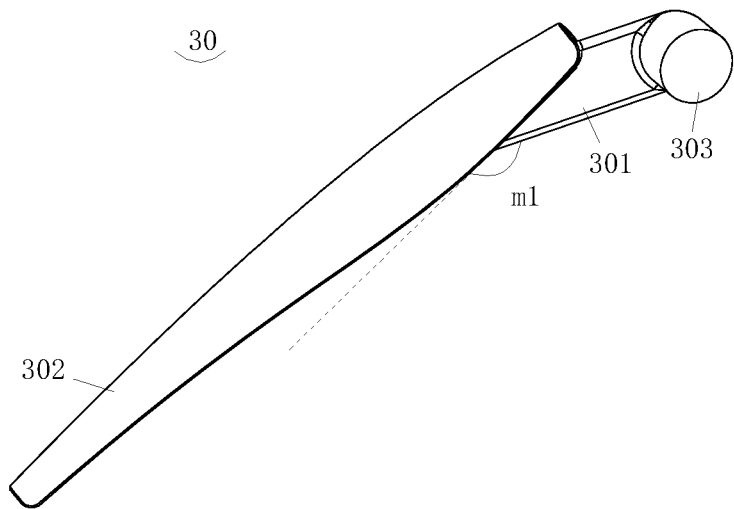
FIG. 10 is a schematic diagram of a first supporting leg according to an embodiment of this disclosure.

For the first supporting leg 30, refer to FIG. 10. The first supporting leg 30 includes a first connecting arm 301, a second connecting arm 302, and a first connector 303. One end of the first connecting arm 301 is connected to the other end of the first transmission shaft 20, and the other end of the first connecting arm 301 is connected to one end of the second connecting arm 302. One end of the first connector 303 is connected to the other end of the first transmission shaft 20, and the other end of the first connector 303 is connected to one end of the first connecting arm 301. An included angle m1 between the first connecting arm 301 and the second connecting arm 302 is an obtuse angle. Because the included angle m1 between the first connecting arm 301 and the second connecting arm 302 is an obtuse angle, when the first supporting leg 30 rotates away from the fuselage 2, the other end of the second connecting arm 302 is closer to the fuselage 2, so that a structure of the unmanned aerial vehicle 100 is compact.

In addition, when the first supporting leg 30 rotates away from the fuselage 2, and the first supporting leg 30 rotates at a specific angle, the included angle ml between the first connecting arm 301 and the second connecting arm 302 is an obtuse angle. Compared with a situation in which the included angle ml between the first connecting arm 301 and the second connecting arm 302 is zero, a vertical distance between the fuselage 2 of the unmanned aerial vehicle 100 and the other end of the second connecting arm 302 is large. When the unmanned aerial vehicle 100 lands on the ground with the assistance of the first supporting leg 30, the fuselage 2 of the unmanned aerial vehicle 100 is retracted, so that more devices can be disposed on the first wall 21 of the fuselage 2.

The other end of the second connecting arm 302 is configured to abut against the first wall 21, and when the other end of the second connecting arm 302 abuts against the first wall 21, a gap exists between the other end of the first connecting arm 301 and the first wall 21 along a direction L2 perpendicular to the first wall 21. Because a gap exists between the other end of the first connecting arm 301 and the first wall 21, the other end of the second connecting arm 302 abuts against the first wall 21.

The first connector 303 is disposed between the first transmission shaft 20 and the first connecting arm 301, so that a distance between the first transmission shaft 20 and the first connecting arm 301 can be adjusted by properly selecting a size of the first connector 303, thereby improving matching of the landing gear 1 and the fuselage 2.

It should be noted that in some embodiments, the first connector 303 can also not be disposed.

For the second transmission shaft 40 and the second supporting leg 50, refer to FIG. 9. One end of the second transmission shaft 40 is connected to the driving device 10, and the other end of the second transmission shaft 40 is connected to the second supporting leg 50. The second transmission shaft 40 drives the second supporting leg 50 to rotate. An included angle a3 between a connection line from one end to the other end of the second supporting leg 50 and a second rotation axis W2 of the second supporting leg 50 is greater than zero, and the connection line from one end to the other end of the second supporting leg 50 does not coincide with the second rotation axis W2 of the second supporting leg 50. An included angle a4 between the second rotation axis W2 and the axial section 21s of the fuselage 2 is an acute angle. Because the included angle a4 between the second rotation axis W2 of the second supporting leg 50 and the axial section 21s of the fuselage 2 is an acute angle, and the included angle a3 between the connection line from one end to the other end of the second supporting leg 50 and the second rotation axis W2 of the second supporting leg 50 is greater than zero, when the second supporting leg 50 rotates, one end of the second supporting leg 50 away from the fuselage 2 can be close to and retracted to the fuselage 2 or away from the fuselage 2.

In some embodiments, an angle range of the acute angle is between 30 and 60 degrees.

In some embodiments, a distance between one end of the first supporting leg 30 away from the first transmission shaft 20 and one end of the second supporting leg 50 away from the second transmission shaft 40 is not greater than a preset value when the first transmission shaft 20 drives the first supporting leg 30 to rotate and the second transmission shaft 40 drives the second supporting leg 50 to rotate, and the preset value is a width of the first wall 21 along the width direction L1 of the fuselage 2. The axial section 21s of the fuselage 2 is perpendicular to the width direction L1 of the fuselage 2, and the first transmission shaft 20 and the second transmission shaft 40 are symmetrically disposed on two sides of the axial section 21s of the fuselage 2. Therefore, when the first transmission shaft 20 drives the first supporting leg 30 to rotate and the second transmission shaft 40 drives the second supporting leg 50 to rotate, the first supporting leg 30 and the second supporting leg 50 can abut against the first wall 21 of the fuselage 2. In other words, when the first supporting leg 30 and the second supporting leg 50 are retracted, the first supporting leg 30 and the second supporting leg 50 can be retracted to the first wall 21, so that obscuration of the photographing field of the unmanned aerial vehicle 100 can be reduced, and resistance of the unmanned aerial vehicle 100 can be reduced during flighting.

It should be noted that in some embodiments, the first transmission shaft 20 and the second transmission shaft 40 are disposed in the concave part 211 of the first wall 21, so that a size of the fuselage 2 of the unmanned aerial vehicle 100 in a direction perpendicular to the first wall 21 is not increased due to the disposing of the first transmission shaft 20 and the second transmission shaft 40.

In some embodiments, refer to FIG. 1, FIG. 2, and FIG. 8. The driving unit 1011 is further disposed on the fourth wall 24, so that the size of the fuselage 2 of the unmanned aerial vehicle 100 in a direction perpendicular to the first wall 21 is not increased due to the driving unit 1011.

It may be understood that refer to FIG. 7 to FIG. 9 together. When the driving device 10 includes the first bracket 103, the second bracket 104, the first bearing 105, and the second bearing 106, the first bracket 103 and the second bracket 104 are disposed on the first wall 21. One end of the first transmission shaft 20 is connected to one end of the synchronous wheel 102 after passing through the first bearing 105, and one end of the second transmission shaft 40 is connected to the other end of the synchronous wheel 102 after passing through the second bearing 106. In other words, the first transmission shaft 20 is disposed on the first wall 21 through the first bracket 103, and the second transmission shaft 40 is disposed on the first wall 21 through the second bracket 104.

It may be understood that when the driving device 10 includes the third bracket 107 and the third bearing 108, the other end of the first transmission shaft 20 is connected to the first supporting leg 30 after being fitted in the third bearing 108, in other words, the first transmission shaft 20 is further disposed on the first wall 21 through the third bracket 107.

It may be understood that when the driving device 10 includes the fourth bracket 109 and the fourth bearing 110, the other end of the second transmission shaft 40 is connected to the second supporting leg 50 after being fitted in the fourth bearing 110, in other words, the second transmission shaft 40 is further disposed on the first wall 21 through the fourth bracket 109.

Refer to FIG. 5. The second transmission shaft 40 may rotate along the second rotation axis W2. When the driving device 10 includes the other driving cell 101a, the driving cell 101a drives the second transmission shaft 40 to rotate along the second rotation axis W2.

The second transmission shaft 40 may rotate along the second rotation axis W2. When the driving device 10 includes the driving assembly 101 and the synchronous wheel 102, the other end of the synchronous wheel 102 drives the second transmission shaft 40 to rotate along the second rotation axis W2.

It should be noted that in some embodiments, the first rotation axis W1 and the second rotation axis W2 are symmetrically arranged relative to the axial section 21s of the fuselage 2, so that the driving device 10 can simultaneously drive the first supporting leg 30 and the second supporting leg 50 to move synchronously, and the first supporting leg 30 and the second supporting leg 50 move in a same direction relative to the fuselage 2.

Refer to FIG. 6. The second transmission shaft 40 can rotate about a third direction O3 and a fourth direction O4. An included angle b2 between the third direction O3 and the fourth direction O4 is an acute angle, the third direction O3 is perpendicular to the axial section 21s of the fuselage 2. The fourth direction O4 coincides with the second rotation axis W2. In other words, the included angle a4 between the fourth direction O4 and the axial section 21s of the fuselage 2 is an acute angle. When the driving device 10 includes one driving cell 101a, the driving cell 101a drives the second transmission shaft 40 to rotate about the third direction O3 and the fourth direction O4.

Refer to FIG. 8 and FIG. 9. The second transmission shaft 40 can rotate about the third direction O3 and the fourth direction O4. An included angle b2 between the third direction O3 and the fourth direction O4 is an acute angle. The third direction O3 is perpendicular to the axial section 21s of the fuselage 2. The fourth direction O4 coincides with the second rotation axis W2. In other words, the included angle a4 between the fourth direction O4 and the axial section 21s of the fuselage 2 is an acute angle. When the driving device 10 includes the driving assembly 101 and the synchronous wheel 102, the other end of the synchronous wheel 102 drives the second transmission shaft 40 to rotate about the third direction O3 and the fourth direction O4. Because one end of the synchronous wheel 102 drives the first transmission shaft 20 to rotate about the first direction O1 and the second direction O2, and the other end of the synchronous wheel 102 drives the second transmission shaft 40 to rotate about the third direction O3 and the fourth direction O4, in other words, the driving device 10 simultaneously drives the first supporting leg 30 and the second supporting leg 50, a structure of the landing gear 1 is compact and occupies little space on the fuselage 2.

It should be noted that in some embodiments, the first direction O1 coincides with the third direction O3.

It should be noted that in some embodiments, the second direction O2 and the fourth direction O4 are symmetrically relative to the axial section 21s of the fuselage 2, so that the driving device 10 simultaneously drives the first supporting leg 30 and the second supporting leg 50 to move synchronously, and the first supporting leg 30 and the second supporting leg 50 move in a same direction relative to the fuselage 2.

It should be noted that in some embodiments, the second transmission shaft 40 is a cardan shaft.

When the second transmission shaft 40 rotates about the third direction O3 and the fourth direction O4, the driving device 10 drives the second transmission shaft 40 to rotate, and the second transmission shaft 40 drives the second supporting leg 50 to rotate about the fourth direction O4, that is, the second transmission shaft 40 drives the second supporting leg 50 to rotate about the second rotation axis W2, so that rotation flexibility of the second supporting leg 50 is good.

For the second supporting leg 50, the second supporting leg 50 includes a third connecting arm (not shown), a fourth connecting arm (not shown), and a second connector (not shown). One end of the third connecting arm is connected to the other end of the second transmission shaft 40, and the other end of the third connecting arm is connected to one end of the fourth connecting arm. One end of the second connector is connected to the other end of the second transmission shaft 40, and the other end of the second connector is connected to one end of the third connecting arm. An included angle between the third connecting arm and the fourth connecting arm is an obtuse angle. Because the included angle between the third connecting arm and the fourth connecting arm is an obtuse angle, when the second supporting leg 50 rotates away from the fuselage 2, the other end of the fourth connecting arm is closer to the fuselage 2, so that a structure of the unmanned aerial vehicle 100 is compact.

In addition, when the second supporting leg 50 rotates away from the fuselage 2, and the second supporting leg 50 rotates at a specific angle, the included angle between the third connecting arm and the fourth connecting arm is an obtuse angle. Compared with a situation in which the included angle between the third connecting arm and the fourth connecting arm is zero, a vertical distance between the fuselage 2 of the unmanned aerial vehicle 100 and the other end of the fourth connecting arm is large. When the unmanned aerial vehicle 100 lands on the ground with the assistance of the second supporting leg 50, the fuselage 2 of the unmanned aerial vehicle 100 is retracted, so that more devices can be disposed on the first wall 21 of the fuselage 2.

The other end of the fourth connecting arm is configured to abut against the first wall 21, and when the other end of the fourth connecting arm abuts against the first wall 21, a gap exists between the other end of the third connecting arm and the first wall 21 along a direction L2 perpendicular to the first wall 21. Because a gap exists between the other end of the third connecting arm and the first wall 21, the other end of the fourth connecting arm abuts against the first wall 21.

The second connector is disposed between the second transmission shaft 40 and the third connecting arm, so that a distance between the second transmission shaft 40 and the third connecting arm can be adjusted by properly selecting a size of the second connector, thereby improving matching of the landing gear 1 and the fuselage 2.

It should be noted that in some embodiments, the second connector can also not be disposed.

It should be noted that even if the second transmission shaft 40 and the second supporting leg 50 may not be placed according to the foregoing manner, an disclosure objective that one end of the first supporting leg 30 away from the fuselage 2 can be close to and retracted to the fuselage 2 or away from the fuselage 2 in this disclosure can still be achieved. In other words, the second transmission shaft 40 and the second supporting leg 50 can be disposed in a manner in which the second rotation axis W2 of the second supporting leg 50 is perpendicular to the axial section 21s of the fuselage 2 in the conventional technology, without affecting the application objective of the end of first supporting leg 30 away from the fuselage 2 can be close to and retracted to the fuselage 2 or away from the fuselage 2 in this disclosure.

It should be noted that the landing gear 1 is further provided with a controller (not shown). The controller is connected to the driving device 10, and is configured to control the driving device 10 to drive the first transmission shaft 20, and the controller is further configured to control the driving device 10 to drive the second transmission shaft 40. Program steps involved in the controller use the existing program procedures. The controller also uses the existing processors, such as an I3 processor of Intel, an AMD Ryzen processor.

In embodiments of this disclosure, an unmanned aerial vehicle 100 includes a fuselage 2 and a landing gear 1. The landing gear 1 includes a driving device 10, a first transmission shaft 20, and a first supporting leg 30. The driving device 10 is disposed on the fuselage 2. One end of the first transmission shaft 20 is connected to the driving device 10, the other end of the first transmission shaft 20 is connected to the first supporting leg 30. The driving device 10 is configured to drive the first transmission shaft 20. The first transmission shaft 20 drives the first supporting leg 30 to rotate. An included angle a1 between a connection line from one end to the other end of the first supporting leg 30 and a first rotation axis W1 of the first supporting leg 30 is greater than zero, and an included angle a2 between the first rotation axis W1 and an axial section 21s of the fuselage 2 is an acute angle. In the foregoing way, because the included angle a2 between the first rotation axis W1 of the first supporting leg 30 and the axial section 21s of the fuselage 2 is an acute angle, and the included angle a1 between the connection line from one end to the other end of the first supporting leg 30 and the first rotation axis W1 of the first supporting leg 30 is greater than zero, when the first supporting leg 30 rotates, one end of the first supporting leg 30 away from the fuselage 2 can be close to and retracted to the fuselage 2 or away from the fuselage 2, making the unmanned aerial vehicle 100 widely applicable. In addition, via a reasonable design, for example, one end of the first supporting leg 30 away from the fuselage 2 can be enabled, by increasing a length of the first supporting leg 30, and/or adjusting the included angle a1 between the connection line from one end to the other end of the first supporting leg 30 and the first rotation axis W1 of the first supporting leg 30, to be close to and retracted to the fuselage 2 when the first supporting leg 30 is retracted towards the fuselage 2, and the end of the first supporting leg 30 away from the fuselage 2 is away from the fuselage 2 when the first supporting leg 30 is extended, so that the first supporting leg 30 can be retracted to the fuselage 2 when retracted, thereby reducing obscuration of the photographing field and reducing flight resistance, and providing stable support for the fuselage 2 when the first supporting leg 30 is extended to support the unmanned aerial vehicle 100 to land on the ground.

In an optional implementation, the landing gear further includes a second transmission shaft and a second supporting leg. One end of the second transmission shaft is connected to the driving device, the other end of the second transmission shaft is connected to the second supporting leg. The driving device is configured to drive the second transmission shaft. The second transmission shaft drives the second supporting leg to rotate. An included angle between a connection line from one end to the other end of the second supporting leg and a second rotation axis of the second supporting leg is greater than zero, and an included angle between the second rotation axis and the axial section of the fuselage is an acute angle.

In an optional implementation, the driving device includes two driving cells. The two driving cells are disposed on the fuselage. One driving cell is connected to one end of the first transmission shaft, the other driving cell is connected to one end of the second transmission shaft, one driving cell is configured to drive the first transmission shaft, and the other driving cell is configured to drive the second transmission shaft.

In an optional implementation, the driving device is configured to drive the first transmission shaft to rotate along the first rotation axis, and the driving device is configured to drive the second transmission shaft to rotate along the second rotation axis.

In an optional implementation, the fuselage includes a first wall, a second wall, and a third wall. The second wall and the third wall are connected to two ends of the first wall along a width direction of the fuselage. The first transmission shaft and the second transmission shaft are disposed on the first wall. A distance between one end of the first supporting leg away from the first transmission shaft and one end of the second supporting leg away from the second transmission shaft is not greater than a preset value when the first transmission shaft drives the first supporting leg to rotate and the second transmission shaft drives the second supporting leg to rotate, and the preset value is a width of the first wall along the width direction of the fuselage.

In an optional implementation, the axial section of the fuselage is perpendicular to the width direction of the fuselage, and the first transmission shaft and the second transmission shaft are symmetrically disposed on two sides of the axial section of the fuselage.

In an optional implementation, the fuselage further includes a fourth wall. The fourth wall is separately connected to the first wall, the second wall, and the third wall. The fourth wall, the first wall, the second wall and the third wall are enclosed to form an accommodating cavity. The first wall is concave towards the accommodating cavity to form a concave part. The first transmission shaft and the second transmission shaft are disposed in the concave part.

In an optional implementation, the driving device is configured to drive the first transmission shaft to rotate about a first direction and a second direction. An included angle between the first direction and the second direction is an acute angle. The first direction is perpendicular to the axial section of the fuselage, and the second direction coincides with the first rotation axis. The driving device is configured to drive the second transmission shaft to rotate about a third direction and a fourth direction. An included angle between the third direction and the fourth direction is an acute angle. The third direction is perpendicular to the axial section of the fuselage, and the fourth direction coincides with the second rotation axis.

In an optional implementation, the driving device includes a driving assembly and a synchronous wheel. The driving assembly is disposed on the fuselage, the driving assembly is connected to the synchronous wheel, and the driving assembly is configured to drive the synchronous wheel to rotate. One end of the synchronous wheel is connected to one end of the first transmission shaft, and when the driving assembly drives the synchronous wheel to rotate, the synchronous wheel drives the first transmission shaft to rotate about the first direction and the second direction. The other end of the synchronous wheel is connected to one end of the second transmission shaft, and when the driving assembly drives the synchronous wheel to rotate, the synchronous wheel drives the second transmission shaft to rotate about the third direction and the fourth direction.

In an optional implementation, the driving assembly includes a driving unit, a driving wheel, and a synchronous belt. The driving wheel is rotatably connected to the driving unit. The synchronous belt is looped around the driving wheel and the synchronous wheel. The driving unit is configured to drive the driving wheel to rotate. The concave part is disposed close to the fourth wall, and the driving unit is disposed on the fourth wall.

In an optional implementation, the first supporting leg includes a first connecting arm and a second connecting arm. One end of the first connecting arm is connected to the other end of the first transmission shaft, and the other end of the first connecting arm is connected to one end of the second connecting arm. An included angle between the first connecting arm and the second connecting arm is an obtuse angle. The other end of the second connecting arm is configured to abut against the first wall, and when the other end of the second connecting arm abuts against the first wall, a gap exists between the other end of the first connecting arm and the first wall along a direction perpendicular to the first wall.

The benefits of embodiments of this disclosure are: An unmanned aerial vehicle is provided, including a fuselage and a landing gear. The landing gear includes a driving device, a first transmission shaft, and a first supporting leg. The driving device is disposed on the fuselage. One end of the first transmission shaft is connected to the driving device, the other end of the first transmission shaft is connected to the first supporting leg. The first transmission shaft is driven by the driving device, and then the first supporting leg is driven. Because an included angle between a first rotation axis of the first supporting leg and an axial section of the fuselage is an acute angle, and the included angle between a connection line from one end to the other end of the first supporting leg and the first rotation axis of the first supporting leg is greater than zero, when the first supporting leg rotates, one end of the first supporting leg away from the fuselage can be close to and retracted to the fuselage or away from the fuselage, making the unmanned aerial vehicle widely applicable. In addition, via a reasonable design, when the first supporting leg is retracted towards the fuselage, the end of the first supporting leg away from the fuselage is close to the fuselage, and when the first supporting leg is extended, the end of the first supporting leg away from the fuselage is away from the fuselage, so that the first supporting leg can be retracted to the fuselage when retracted, and when the first supporting leg is extended to support the unmanned aerial vehicle to land on the ground, stable support for the fuselage is provided.

It should be noted that exemplary embodiments of this disclosure are provided in the specification and accompanying drawings of this disclosure. However, this disclosure may be implemented in many different forms, and is not limited to the embodiments described in the specification. These embodiments are not considered as additional restrictions on the content of this disclosure. The objective of providing these embodiments is to enable a more thorough and comprehensive understanding of the disclosure of this disclosure. Moreover, embodiments that are not listed above formed by combining the foregoing technical features are regarded as falling within the scope of the specification of this disclosure. In addition, for a person of ordinary skill in the art, improvements or modifications may be made according to the above descriptions, and all these improvements and modifications shall fall within the protection scope of the appended claims of this disclosure.

What is claimed is:

1. An unmanned aerial vehicle, comprising
a fuselage, and
a landing gear, comprises a driving device, a first transmission shaft, and a first supporting leg;
the driving device is disposed on the fuselage, a first end of the first transmission shaft is connected to the driving device, a second end of the first transmission shaft is connected to the first supporting leg, and the driving device is configured to drive the first transmission shaft, the first transmission shaft drives the first supporting leg to rotate, an included angle between a connection line from one end to the other end of the first supporting leg and a first rotation axis of the first supporting leg is greater than zero, and an included angle between the first rotation axis and an axial section of the fuselage is an acute angle;

the driving device comprises a driving assembly and a synchronous wheel, the driving assembly is disposed on the fuselage, the driving assembly is connected to the synchronous wheel, and the driving assembly is configured to drive the synchronous wheel to rotate;

a first end of the synchronous wheel is connected to the first end of the first transmission shaft, and when the driving assembly drives the synchronous wheel to rotate, the synchronous wheel drives the first transmission shaft to rotate about the first direction and the second direction.

2. The unmanned aerial vehicle according to claim 1, wherein the landing gear further comprises a second transmission shaft and a second supporting leg, a first end of the second transmission shaft is connected to the driving device, a second end of the second transmission shaft is connected to the second supporting leg, and the driving device is configured to drive the second transmission shaft, the second transmission shaft drives the second supporting leg to rotate, an included angle between a connection line from one end to the other end of the second supporting leg and a second rotation axis of the second supporting leg is greater than zero, and an included angle between the second rotation axis and the axial section of the fuselage is an acute angle.

3. The unmanned aerial vehicle according to claim 2, wherein the driving device comprises two driving cells, the two driving cells are disposed on the fuselage, a first driving cell is connected to the first end of the first transmission shaft, a second driving cell is connected to the first end of the second transmission shaft, the first driving cell is configured to drive the first transmission shaft, and the second driving cell is configured to drive the second transmission shaft.

4. The unmanned aerial vehicle according to claim 3, wherein the driving device is configured to drive the first transmission shaft to rotate along the first rotation axis, and the driving device is configured to drive the second transmission shaft to rotate along the second rotation axis.

5. The unmanned aerial vehicle according to claim 2, wherein
the fuselage comprises a first wall, a second wall, and a third wall, and the second wall and the third wall are connected to two ends of the first wall along a width direction of the fuselage;
the first transmission shaft and the second transmission shaft are disposed on the first wall; and
a distance between a first end of the first supporting leg away from the first transmission shaft and a first end of the second supporting leg away from the second transmission shaft is not greater than a preset value when the first transmission shaft drives the first supporting leg to rotate and the second transmission shaft drives the second supporting leg to rotate, and the preset value is a width of the first wall along the width direction of the fuselage.

6. The unmanned aerial vehicle according to claim 5, wherein the axial section of the fuselage is perpendicular to the width direction of the fuselage, and the first transmission shaft and the second transmission shaft are symmetrically disposed on two sides of the axial section of the fuselage.

7. The unmanned aerial vehicle according to claim 6, wherein
the fuselage further comprises a fourth wall, the fourth wall is separately connected to the first wall, the second wall, and the third wall, and the fourth wall, the first wall, the second wall and the third wall are enclosed to form an accommodating cavity; and
the first wall is concave towards the accommodating cavity to form a concave part, and the first transmission shaft and the second transmission shaft are disposed in the concave part.

8. The unmanned aerial vehicle according to claim 7, wherein
the driving device is configured to drive the first transmission shaft to rotate about a first direction and a second direction, an included angle between the first direction and the second direction is an acute angle, the first direction is perpendicular to the axial section of the fuselage, and the second direction coincides with the first rotation axis; and
the driving device is configured to drive the second transmission shaft to rotate about a third direction and a fourth direction, an included angle between the third direction and the fourth direction is an acute angle, the third direction is perpendicular to the axial section of the fuselage, and the fourth direction coincides with the second rotation axis.

9. The unmanned aerial vehicle according to claim 1, wherein
a second end of the synchronous wheel is connected to the first end of the second transmission shaft, and when the driving assembly drives the synchronous wheel to rotate, the synchronous wheel drives the second transmission shaft to rotate about the third direction and the fourth direction.

10. The unmanned aerial vehicle according to claim 8, wherein the third direction coincides with the first direction.

11. The unmanned aerial vehicle according to claim 9, wherein the driving assembly comprises a driving unit, a driving wheel, and a synchronous belt, the driving wheel is rotatably connected to the driving unit, the synchronous belt is looped around the driving wheel and the synchronous wheel, the driving unit is configured to drive the driving wheel to rotate, the concave part is disposed close to the fourth wall, and the driving unit is disposed on the fourth wall.

12. The unmanned aerial vehicle according to claim 9, wherein the driving device further comprises a first bracket, a second bracket, a first bearing, and a second bearing; and
the first bracket is provided with a first through hole, the first bearing is mounted in the first through hole, the second bracket is provided with a second through hole, the second bearing is mounted in the second through hole, the first end of the first transmission shaft passes through the first bearing and then is connected to the first end of the synchronous wheel, and the first end of the second transmission shaft passes through the second bearing and then is connected to the second end of the synchronous wheel.

13. The unmanned aerial vehicle according to claim 9, wherein the driving device further comprises a third bracket and a third bearing, the third bracket is provided with a third through hole, the third bearing is mounted in the third through hole, and the second end of the first transmission shaft is fitted in the third bearing and then connected to the first supporting leg.

14. The unmanned aerial vehicle according to claim 9, wherein the driving device further comprises a fourth bracket and a fourth bearing, the fourth bracket is provided with a fourth through hole, the fourth bearing is mounted in the fourth through hole, and the second end of the second transmission shaft is fitted in the fourth bearing and then connected to the second supporting leg.

15. The unmanned aerial vehicle according to claim 7, wherein
    the first supporting leg comprises a first connecting arm and a second connecting arm, the first end of the first connecting arm is connected to the second end of the first transmission shaft, a second end of the first connecting arm is connected to a first end of the second connecting arm, and an included angle between the first connecting arm and the second connecting arm is an obtuse angle.

* * * * *